Feb. 21, 1939.  J. A. MOREHEAD  2,147,914
LAMP LENS
Original Filed March 9, 1936

INVENTOR
James A. Morehead
BY Morris Spector,
ATTORNEY.

Patented Feb. 21, 1939

2,147,914

UNITED STATES PATENT OFFICE 2,147,914

LAMP LENS

James A. Morehead, Huntington, W. Va., assignor to Samuel M. Dover, Chicago, Ill.

Original application March 9, 1936, Serial No. 67,881. Divided and this application August 24, 1936, Serial No. 97,517

5 Claims. (Cl. 88—81)

This application is a division of my pending application Serial No. 67,881, filed March 9, 1936.

This invention relates to lenses, and more particularly to such lenses as are used on automobile tail lights, or the like.

In recent years there has been developed a tail light lens having a very high degree of reflectivity, the structure being such that light from the head lights of an approaching automobile is reflected back in the form of a slightly spreading beam, to indicate to an approaching motorist the presence of an automobile in front, even though the lamp of the tail light of the forward automobile is not functioning. Such lenses are generally of a ruby color and, wth a very high degree of reflectivity, they appear to be about as bright from reflected light as from transmitted light, that is, when the bulb of the tail lamp is lighted. It has been recognized that this is an undesirable condition. To overcome this, means has been provided for causing the lens to take on a different appearance under transmitted light than under reflected light. It is to such lenses that the present invention more particularly appertains.

In the preferred embodiment of the present invention the lens is provided with an insertion of glass of a different color from that of the main body, and of negligible light reflecting properties, although of high light transmitting properties. This piece of glass is molded directly into the body of the lens so as to form one integral piece therewith.

It is a further object of the present invention to provide a lens of the above character wherein the insert is held in place in a simple and reliable manner so that the same cannot possibly be displaced from the rest of the lens.

The attainment of the above and further objects of the present invention will be apparent from the following specification taken in conjunction with the accompanying drawing forming a part thereof.

Figure 1:
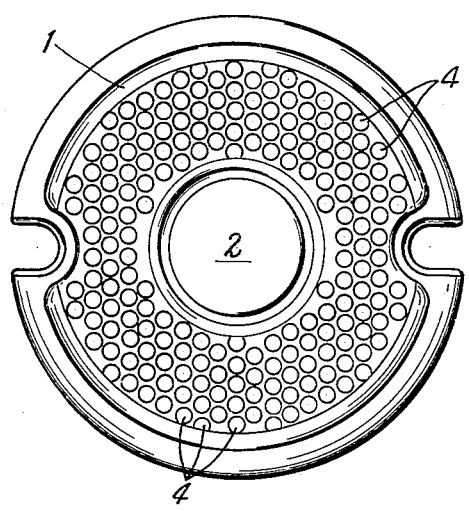
Figure 1 is a front view of a lens constructed in accordance with the teachings of my invention.
Figure 2:
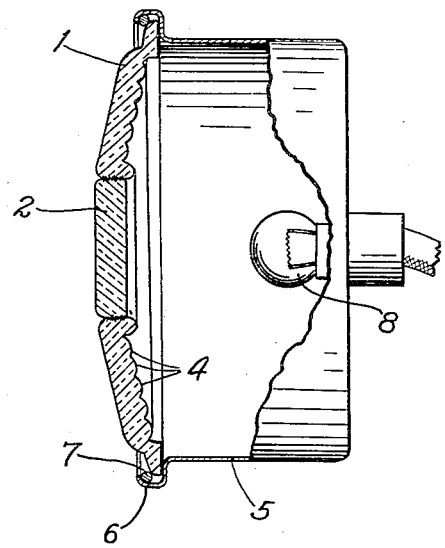
Figure 2 is a longitudinal sectional view through the lens, and showing the same applied to the tail lamp of an automobile.
Figure 3:
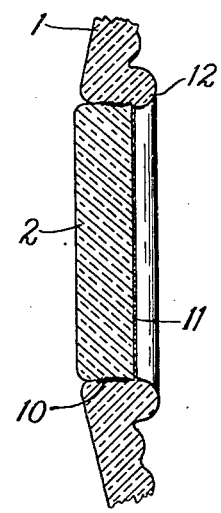
Figure 3 is an enlarged sectional view of a portion of the lens of Figures 1 and 2.

Reference may now be had more particularly to Figures 1, 2 and 3. The lens of Figure 1 comprises a body 1 of glass, preferably, although not necessarily, ruby colored, and an insert 2, also of glass, and of different light transmitting and light reflecting properties from that of 1. The insert 2 is preferably, although not necessarily, blue, that is, contains cobalt blue, and is of high light transmitting properties. This insert is not particularly adapted as a reflector. A number of protuberances 4 may be formed on the back surface of the body 1 in order to increase the light reflecting properties of the body 1 of the lens. These protuberances may be of any shape known in the art, for accomplishing this purpose. For instance, they may be projections in the forms of substantially right angled cones, as shown in the patent to Sharp, No. 1,675,431, or they may be in the form of tetrahedrons, as shown in the patent to Stimson, No. 1,874,138, or they may be in the form of reflecting buttons. The purpose of these projections is to reflect light from the head lights of an approaching automobile, in the form of a slightly spreading beam along substantially the path of the incident beam, so that the tail lamp lens will be rendered clearly visible to the approaching motorist by light reflected from the head lights of the approaching automobile. The insert 2 has no such light reflecting properties. Therefore, under reflected light, the lens will appear as a ruby colored ring, or disc, having a center dark spot.

In Figure 2 I have illustrated a tail lamp of standard construction, except for the improved lens. It is understood that my present lens is applicable to other forms of lamps. The tail lamp shown by way of illustration comprises a metal body 5 having an overhanging rim 6 in which is inserted a spring ring 7 that holds the lens in place, in a manner well known in the art, although any other means may be used for holding the lens in place. An electric light bulb 8 is provided, as is usual. Light from the bulb passes through the body of the glass 1, in the usual manner, to produce a bright ruby colored illumination. The light also passes through the center insert 2 and produces a very bright beam of white light. This light is entirely absent when the lens is illuminated by reflection, and therefore serves as a distinguishing characteristic to indicate when the bulb 8 is lighted.

Reference may now be had to Figure 3 which shows the manner whereby the insert 2 is held in place in the body 1.

The glass of the insert merges and is fused with the glass of the body 1 at the periphery 10 thus firmly uniting the two. In addition, there is a thin, practically invisible, layer of glass 11 on the back of the insert 2, said layer being part of and integral with the main body 1, and being also fused into the back of the insert 2. This layer 11 is so thin that it does not modify the light transmitting characteristics of the insert 2, but it does help hold the insert 2 in place.

Figure 4:
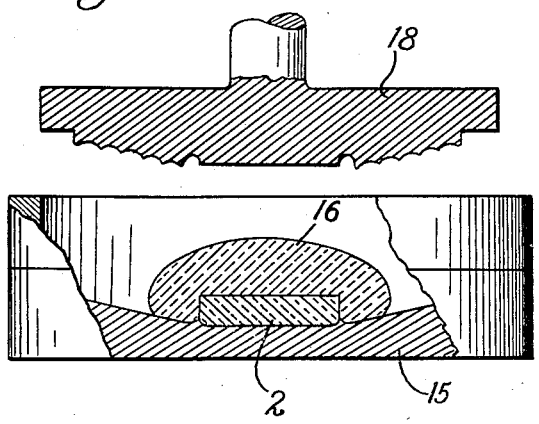
Figure 4 is a diagrammatic, fragmentary sectional view of a pair of molds within which the lens is made.

In Figure 4 I have shown, diagrammatically, a method of making the lens of Figures 1, 2 and 3. The insert 2 is first made in any desired manner, as by molding, and then, while it is still hot, it is placed in a mold 15, in which the lens proper is to be formed. A mass of glass 16 is then dropped into the mold 15, and the plunger 18 is then pressed into the mold 15 to press the mass of glass 16 to the desired shape. The glass 2 is preferably of a kind having a coefficient of expansion and contraction substantially the same as that of the glass 16, which is to constitute the body portion 1. They are both preferably, but not necessarily, silica glass. The body of glass 16 may be of a temperature of approximately 1800° F. when it is dropped into the mold 15. At that time the temperature of the insert 2 is about 1000°, although these temperatures may be varied over a very wide range. With glass of this kind it is essential that the temperature of the insert 2 shall be quite high at the time the molten glass 16 first comes in contact with it, for otherwise the chill might produce undesirable stresses in the glass resulting, perhaps, in cracking of the same. The die 18 presses the mass of glass 16 to the desired shape, namely, the shape shown in Figures 1, 2 and 3. After the glass has set sufficiently, the plunger 18 is retracted from the mold, and thereafter the lens is withdrawn. During the process of making the lens, the heat of the body of glass 16 in contact with the insert 2 causes a fusion of the glass 16 with the insert 2, to form an integral mass of glass. The bead 12 formed in the body 1, around the insert 2, by the mold 18, serves to strengthen the body 1 along the insert 2 so that as the glass of the body 1 contracts, and shrinks around the insert, it will tightly grip the same, without any danger of cracking, or undue stressing of the material.

From the above description it is apparent that I have provided a simple lens that has a distinctly different appearance when viewed by reflected light than when viewed by transmitted light. In the lens here illustrated the difference is primarily one of color. By transmitted light the center portion appears as a white beam surrounded by a red field at the portion 1. By reflected light the body 1 appears red and the center portion appears black, due to lack of reflection. If desired, the insert 2 may be made to have high light reflecting properties and no light transmitting properties. This can be accom-
plished by forming a mirror reflecting layer on
the back of the insert 2, whereby external light is reflected, but no light from the bulb 8 is transmitted through the insert. As another alternative, the lens may be constructed so that the sole difference is one of color. The insert 2 may have the same (or different) type of protuberances thereon as the lens portion 1, in which event the portion of glass 11 is omitted. By making the lens portion 2 of glass of different color from the portion 1, the desired results may be obtained.
The portion 2 may be made of glass that appears one color by transmitted light and a different color by reflected light.

The lens part 2 may be joined with the part 1 by means other than fusion. For instance, it may be cemented in place.

In compliance with the requirements of the patent statutes I have here shown and described a preferred embodiment of my invention. It is, however, to be understood that the invention is not limited to the precise construction here shown, the same being merely illustrative of the principles of the invention. What I consider new and desire to secure by Letters Patent is:

1. A lamp lens comprising a body of glass having reflecting protuberances extending from one surface thereof to render the same highly reflecting and a glass insert therein having low light reflecting properties, said two pieces being fused together at the periphery of the insert, said first body of glass having joined thereto a thin transparent layer overlying one face of the second piece and fused thereto over at least a substantial portion of its area.

2. A light transmitting and reflecting signalling lamp lens having a portion adapted to transmit light therethrough from a light source and a portion adapted to reflect light along a path substantially parallel to the incident beam, said two portions being of different kinds of glass, one of said portions comprising a pre-formed body of glass extending into and integrally united at its periphery with the other portion, said other portion having joined thereto a thin layer of glass overlying the insert and integrally united therewith over at least a substantial portion of its area.

3. A signal lamp lens comprising a main body of glass of a danger indicating color and having means at the periphery thereof for mounting the same in a lamp, and an insert comprising a body of glass of a different color than that of the main body and surrounded by the main body, said two bodies of glass being united together along the periphery of the insert to form one integral structure, and in addition said first body of glass having joined thereto a thin layer of glass overlying one face of the insert and united thereto over at least a substantial portion of its area, one of said bodies of glass having surfaces formed to reflect light from a distant source in the general direction of the light source.

4. A signal lamp lens comprising a main body of a danger indicating color, and an insert comprising a body of material having different light transmitting characteristics than that of the material of the main body and surrounded by the main body, said two bodies being united along the periphery of the insert to form one integral structure, and in addition said first body having joined thereto a thin layer of the material of which it is made which layer overlies one face of the insert and is united thereto over at least a substantial portion of its area, one of said bodies having surfaces formed to reflect light from a distant source in the general direction of the light source.

5. A light transmitting and reflecting signal lamp lens having a portion adapted to transmit light therethrough from a light source and a portion adapted to reflect light along a path substantially parallel to the incident beam, one of said portions comprising a preformed body extending into and integrally united at its periphery with the other portion and said other portion having joined thereto a thin layer of lens material overlying the insert and integrally united therewith over at least a substantial portion of its area, said lens and insert and overlying layer being of light pervious glass-like material and said insert being of different color material than that of the other portion of the lens and than that of the overlying layer.

JAS. A. MOREHEAD.